Sept. 20, 1949.                J. V. DAVIS                2,482,326
                        DRIVE FOR ROTARY TABLES
                         Filed Sept. 30, 1947
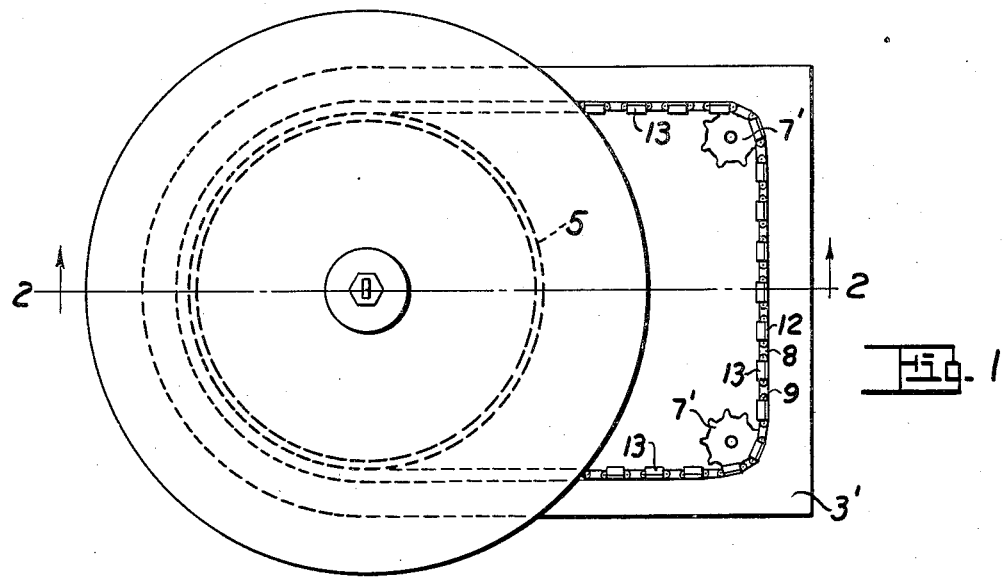
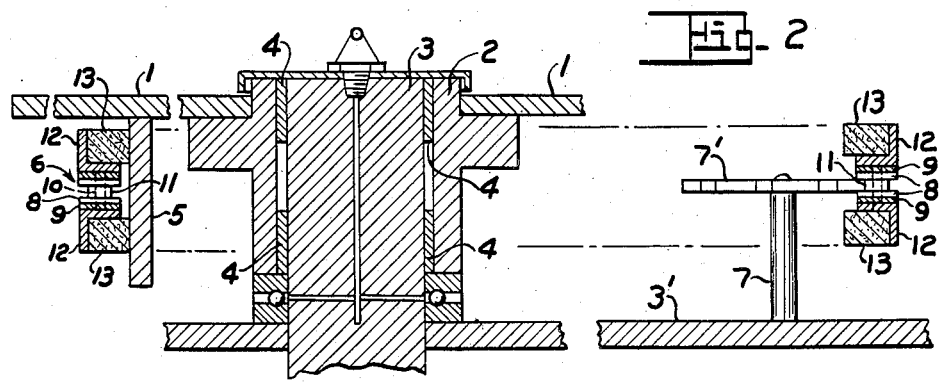
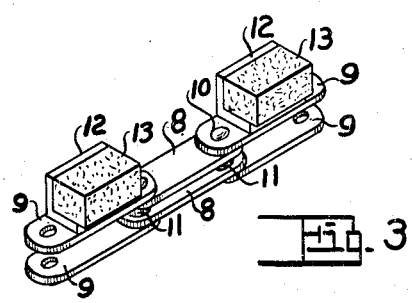
INVENTOR.
JOHN V. DAVIS.
BY
*Samuel C. Wiseman*
ATTORNEY.

Patented Sept. 20, 1949

2,482,326

UNITED STATES PATENT OFFICE 2,482,326

DRIVE FOR ROTARY TABLES

John V. Davis, Detroit, Mich., assignor to The Udylite Corporation, Detroit, Mich., a corporation of Delaware Application September 30, 1947, Serial No. 777,037

10 Claims. (Cl. 74—245)

The present invention pertains to a novel drive for rotary work tables.

Ordinarily a rotary table is driven by a sprocket wheel, a gear or other machined part carried thereby, the driving element consisting of a sprocket chain or another gear. The fabrication of any these machined parts is relatively expensive, and the principal object of the invention is to provide a reliable and less costly mechanism for driving the table.

A sprocket chain is desirable for the driving element inasmuch as it can be purchased in standard sizes and is therefore relatively inexpensive. Another object of the invention, in this connection is to adapt a sprocket chain for driving the table, without the necessity of an expensive or machined part on the table for engagement with the sprocket chain.

In the accomplishment of these objects the table top is provided with a cylindrical skirt mounted concentric with the axis of rotation and preferably on the lower surface. A conventional sprocket chain, preferably a double chain, is passed around the skirt and also around an external drive sprocket. The driving engagement between the chain and the skirt is effected by a series of closely spaced friction elements carried by the chain and adapted to engage the adjacent portion of the skirt. The outside diameter of the skirt is substantially greater than the spacing between the friction elements so that the skirt is always engaged by a substantial number of elements which insure a non-slipping drive between the chain and the skirt.

In the preferred construction, the friction elements are in the nature of blocks mounted in angle pieces which in turn are fastened to both laps of the double chain, thereby providing two rows of friction elements in engagement with the skirt. Because of this arrangement and the close spacing of the elements as previously set forth, the chain will not slip on the skirt notwithstanding a substantial load on the table.

The invention is fully disclosed by way of example in the following description and in the accompanying drawings in which:

Figure 1 is a plan view of the device;

Figure 2 is a section on the line 2—2 of Figure 1, and

Figure 3 is a detail perspective view.

Reference to these views will now be made by use of like characters which are employed to designate corresponding parts throughout.

In Figure 1 is shown the top plate 1 of a rotary table supported for rotation in any suitable manner. For example, the top 1 may be set upon a shouldered sleeve 2 which in turn is journalled on a central vertical shaft 3 through sleeve bearings 4, as shown in my co-pending application Serial No. 662,055, filed April 13, 1946. A sprocket chain for turning the table is very desirable and effective but the cost of a sprocket wheel attached concentrically to a table of substantial size would be prohibitive.

Instead, the invention provides a flange for skirt 5 secured concentrically to the table top 1 and preferably to the lower surface thereof. A bed plate 3' is supported by the shaft 3 and carries vertical sprocket shafts 7. A sprocket chain 6 is passed around thte skirt 5 and also around one or more sprocket wheels 7', one of which is a driver. It will be understood that the chain 6 meshes with the sprocket wheels 7 in the usual manner. No sprocket teeth or special formations are provided on the outer surface of the skirt 5 which is merely a cylindrical tubular member.

The chain 6 is a double sprocket chain comprising, at each side, a series of spaced inner links 8 joined by intervening outer links 9 articulated together by pins 10 extending from one side of the chain to the other. The pins are surrounded by rollers 11 between the sets of inner links 8 to maintain the latter and to cooperate better with the sprocket wheels 7' in meshing therewith.

To the outer surfaces of the outer links 9, or to selected links at relatively close intervals are secured angle brackets 12, with one side secured to a link 9 and the other side spaced from the skirt 5 so that the angle in the bracket opens toward the skirt. In each angle bracket is fitted and secured a friction block 13 extending into firm engagement with the outer surface of the skirt 5 when the block is on the portion of the chain passing around the skirt. The blocks consist of any suitable material having a high coefficient of friction with the outer surface of the skirt 5, such as a fibrous molded material, for example. The blocks are secured in the angle pieces by any suitable means, and similarly the angle pieces 12 are fastened to the outer surfaces of the links 9 by any suitable means such as welding.

The diameter of the skirt 5 is such, with relation to the spacing of the blocks 13, that its outer surface is engaged by a substantial number of blocks. In the movement of the chain, the friction between the skirt 5 and the blocks in engagement therewith is sufficient to turn the table without slippage although carrying a substantial load.

It is now evident that the invention provides a simple and effective drive for a work table and one that is considerably less expensive than the sprocket wheel or other machined driven member applied to the table.

Although a specific embodiment of the invention has been illustrated and described, it will be understood that various alterations in the details of construction may be made without departing from the scope of the invention as indicated by the appended claims.

What I claim is:

1. In a rotatably mounted work table, a table top, a skirt carried by said top and concentric with the axis of rotation, a chain passed around said skirt and including articulated links, closely spaced friction elements carried by said links and adapted to engage the outer surface of said skirt, and means for driving said chain.

2. In a rotatably mounted work table, a table top, a skirt carried by said top and concentric with the axis of rotation, a chain passed around said skirt, closely spaced angle members carried by links of said chain, friction elements secured in said angle members and adapted to engage the outer surface of said skirt, and means for driving said chain.

3. In a rotatably mounted work table, a table top, a skirt carried by said top and concentric with the axis of rotation, a chain passed around said skirt and including articulated links, closely spaced friction elements carried by said links and adapted to engage the outer surface of said skirt, and means for driving said chain, the outside diameter of said skirt being substantially greater than the spacing of said elements, whereby the outer circumference of said skirt is always engaged by a substantial number of said elements.

4. In a rotatably mounted work table, a table top, a skirt carried by said top and concentric with the axis of rotation, a chain passed around said skirt, closely spaced angle members carried by links of said chain, friction elements secured in said angle members and adapted to engage the outer surface of said skirt, and means for driving said chain, the outside diameter of said skirt being substantially greater than the spacing of said elements, whereby the outer circumference of said skirt is always engaged by a substantial number of said elements.

5. In a rotatably mounted work table, a table top, a skirt carried by said top and concentric with the axis of rotation, a chain passed around said skirt and including articulated links, closely spaced friction elements carried by said links and adapted to engage the outer surface of said skirt, and a drive wheel engaged by said chain outside the periphery of said table top and holding said chain taut.

6. In a rotatably mounted work table, a table top, a skirt carried by said top and concentric with the axis of rotation, a double chain passed around said skirt and including upper and lower sets of links, closely spaced friction elements carried by links of both sets and adapted to engage the outer surface of said skirt, and means for driving said chain.

7. In a rotatably mounted work table, a table top, a skirt carried by said top and concentric with the axis of rotation, a double chain passed around said skirt and including upper and lower sets of links, closely spaced angle members carried by links of both sets, friction elements carried by links of both sets and adapted to engage the outer surface of said skirt, and means for driving said chain.

8. In a rotatably mounted work table, a table top, a skirt carried by said top and concentric with the axis of rotation, a double chain passed around said skirt and including upper and lower sets of links, closely spaced friction elements carried by links of both sets and adapted to engage the outer surface of said skirt, and means for driving said chain, the outside diameter of said skirt being substantially greater than the spacing of said elements, whereby the outer circumference of said skirt is always engaged by a substantial number of said elements.

9. In a rotatably mounted work table, a table top, a skirt carried by said top and concentric with the axis of rotation, a double chain passed around said skirt and including upper and lower sets of links, closely spaced friction elements carried by links of both sets and adapted to engage the outer surface of said skirt, and a drive wheel engaged by said chain outside the periphery of said table top and holding said chain taut.

10. In a rotatably mounted work table, a table top, a skirt carried by said top and concentric with the axis of rotation, a double chain passed around said skirt and including upper and lower sets of links, closely spaced angle members carried by links of both sets, friction elements carried by links of both sets and adapted to engage the outer surface of said skirt, and a drive wheel engaged by said chain outside the periphery of said table top and holding said chain taut.

JOHN V. DAVIS.

REFERENCES CITED

The following references are of record in the file of this patent:

UNITED STATES PATENTS

| Number | Name | Date |
| --- | --- | --- |
| 584,320 | Boyd | June 15, 1897 |
| 905,018 | Sullivan et al. | Nov. 24, 1908 |
| 2,404,156 | Abbott | July 16, 1946 |
| 2,405,387 | Yeomans et al. | Aug. 6, 1946 |